(12) United States Patent
Oliver (10) Patent No.: US 7,905,502 B2
(45) Date of Patent: Mar. 15, 2011

(54) EQUIPMENT CARRIER

(76) Inventor: Edward J. Oliver, Groton, SD (US)

( * ) Notice: Subject to any disclaimer, the term of this patent is extended or adjusted under 35 U.S.C. 154(b) by 322 days.

(21) Appl. No.: 12/157,626

(22) Filed: Jun. 12, 2008

(65) Prior Publication Data

US 2009/0309323 A1 Dec. 17, 2009

(51) Int. Cl.
*B62B 1/04* (2006.01)
(52) U.S. Cl. ............. 280/47.18; 280/47.28; 280/35
(58) Field of Classification Search .......... 280/35, 280/47.18, 47.19, 47.2, 47.23, 47.24, 47.27, 280/47.28, 47.29, 47.35
See application file for complete search history.

(56) References Cited

U.S. PATENT DOCUMENTS

| | | | | | |
|---|---|---|---|---|---|
| 5,362,078 | A | * | 11/1994 | Paton | 280/47.18 |
| 5,799,958 | A | * | 9/1998 | Bishop | 280/47.26 |
| 6,616,152 | B2 | * | 9/2003 | Oliver | 280/47.18 |
| 6,659,476 | B2 | * | 12/2003 | Weida | 280/47.19 |
| 6,929,269 | B2 | * | 8/2005 | Oliver | 280/47.18 |
| 7,628,406 | B1 | * | 12/2009 | Thomas et al. | 280/47.19 |

* cited by examiner

*Primary Examiner* — J. Allen Shriver, II
*Assistant Examiner* — John D Walters
(74) *Attorney, Agent, or Firm* — Antonio Papageorgiou; Ostrow Kautman LLP (57) ABSTRACT

An equipment carrier for transporting one or more work items includes a vertical frame attached to a base frame, where the base frame has, in a preferred embodiment, an expandable portion that telescopes out from the vertical frame. The equipment carrier also includes a locking mechanism for attaching the equipment carrier to a standard dolly. The use of the equipment carrier in combination with the dolly allows for easy transport of the equipment carrier. In one embodiment, work piece arms for supporting work items are pivotally connected to the front of the vertical frame allowing them to swing into horizontal position and then fold down into a vertical position. Also attached to the vertical frame is a strut that is also pivotally connected to the front face of the vertical frame. The strut swings up to support the work piece arm when it is in the horizontal position. The equipment carrier also has components for carrying additional accessories work items needed.

12 Claims, 8 Drawing Sheets

EQUIPMENT CARRIER

BACKGROUND OF THE INVENTION

1. Field of the Invention

This invention relates to devices and methods for transporting and storing work items and related items.

2. Description of Related Art

It is often necessary or desirable to easily transport or store work items. For example, workers often carry their tool boxes to a job site. Because tool boxes can be quite heavy, this at least strains the worker and at some point, the tool box or boxes may become too heavy to carry. As a result, many workers attach one or more tool boxes to wheeled carts or dollies in order to facilitate this transport. However, such carts or dollies are not primarily intended to transport tool boxes and so require the tool boxes to be attached in an ad hoc manner (e.g., by bungee cords, straps or rope) or sometimes just left resting on the cart or dolly with no restraint. Transporting two or more tool boxes compounds this problem. In addition, it is usually difficult to use the tool boxes when they are attached to the cart because the attachment mechanism often interferes with the functional use of the tool box.

A similar problem occurs with the transport of work items such as compressed gas tanks such as those used to cut or weld, buckets, barrels, crates, tubs or boxes. These work items are typically attached to a dolly to be transported. For example, where the work item is a set of compressed gas tanks, each such set requires a dolly. However, once the tanks are moved to a desired location, the wheeled aspect of the dolly is no longer needed until the tanks need to be moved again. Because the dolly is usually needed for only a small amount of time required to move the tanks but is still attached to the tanks, the expensive dolly cannot be used to transport other tanks or work items. This is true for the transport of other work items as well. Consequently, this is an inefficient use of an expensive piece of equipment (the dolly).

Further, work items such as described above are typically expensive articles that require significant care during transportation and storage. They may also be quite heavy or bulky or both. Some work items also have accessory work items attached such as hoses, ropes or cable that hang below or over the primary work item. The weight in combination with bulky size and sometimes hanging accessory work items makes the work items quite cumbersome or unsafe for a person to carry and often puts the expensive work items at risk Therefore it is desirable to provide a device for safely and easily storing or transporting a primary work item that also accommodates additional accessory work items.

Also, some times the work items are made of pliable materials that have a tendency to mold the shape of the support. If such work items are unsupported or improperly supported by being laid on a flat surface for a lengthy amount of time, these work items becomes deformed and unsuitable for use. Therefore it is important that these work items are transported and stored properly to prevent damage to them.

In view of the foregoing, it is desirable to have a device for transporting or storing work items, with any accompanying accessory work items, that eliminates these stated problems.

SUMMARY OF THE INVENTION

The present invention is an equipment carrier that is connectable to a standard dolly to allow for easy transportation of work items. The equipment carrier is essentially a frame and associated components that are connectable to a dolly. The resulting combination allow for easy transportation of the work items, not only in a work place setting, but also when transporting the work items around the work place or to other work places. When coupled, the equipment carrier and dolly act as one unit that is capable of transporting one or more work items as well as various other work related items.

The equipment carrier is also useful as an independent tool or work item storage device. For this purpose, the equipment carrier may be separated from the dolly to work as a stationary storage frame. In one embodiment of the equipment carrier, the frame has foldable work piece arms that operate to receive work items for transportation and storage while maintaining the integrity of the tools or work items. In another embodiment of the equipment carrier, the equipment carrier has an expanding bottom frame to facilitate transportation of a garbage or storage bucket or barrel, crate, tub or box or other large item or to increase the stability of the equipment carrier when carrying large work items or work items that extend over the edges of the equipment carrier.

The present invention addresses the needs of transporting one or more work items on a conveniently separated storage rack. The inventive device is characterized in a series of embodiments by dual functionality of both a frame that can easily be transported by a standard dolly as well as having convenient folding features to reduce the size of the frame when it is not needed for operation. The frame/carrier combination is particularly well adapted to transport large articles as well as having additional features for the storage of work items or accessory work items.

There are many objects of the present invention in its various embodiments that may be addressed individually or in combinations and permutations. Each embodiment may address one or several of the following objectives.

An object of this invention in one embodiment or variant of the invention is to provide a device for safely transporting a primary work item.

Another object of this invention in one embodiment or variant of the invention is to provide a device for easily transporting a primary work item.

Another object of this invention in one embodiment or variant of the invention is to provide a device for safely storing a primary work item.

Another object of this invention in one embodiment or variant of the invention is to provide a device for easily storing a primary work item.

Another object of this invention in one embodiment or variant of the invention is to provide a device that also accommodates additional accessory work items.

Another object of this invention in one embodiment or variant of the invention is to provide a device that is easily able to be reduced in size when not in use.

These and other objects and advantages of the invention will be clear in view of the following description to the invention including the associated drawings.

BRIEF DESCRIPTION OF THE DRAWINGS

The invention will be described hereafter in detail with particular reference to the drawings. Throughout this description, like elements, in whatever embodiment described, refer to common elements wherever referred to and referenced by the same reference number. The characteristics, attributes, functions, interrelations ascribed to a particular element in one location apply to that element when referred to by the same reference number in another location unless specifically stated otherwise. All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength and similar requirements will likewise be within the skill of the art after the following description has been read and understood.

DETAILED DESCRIPTION

Figure 1:
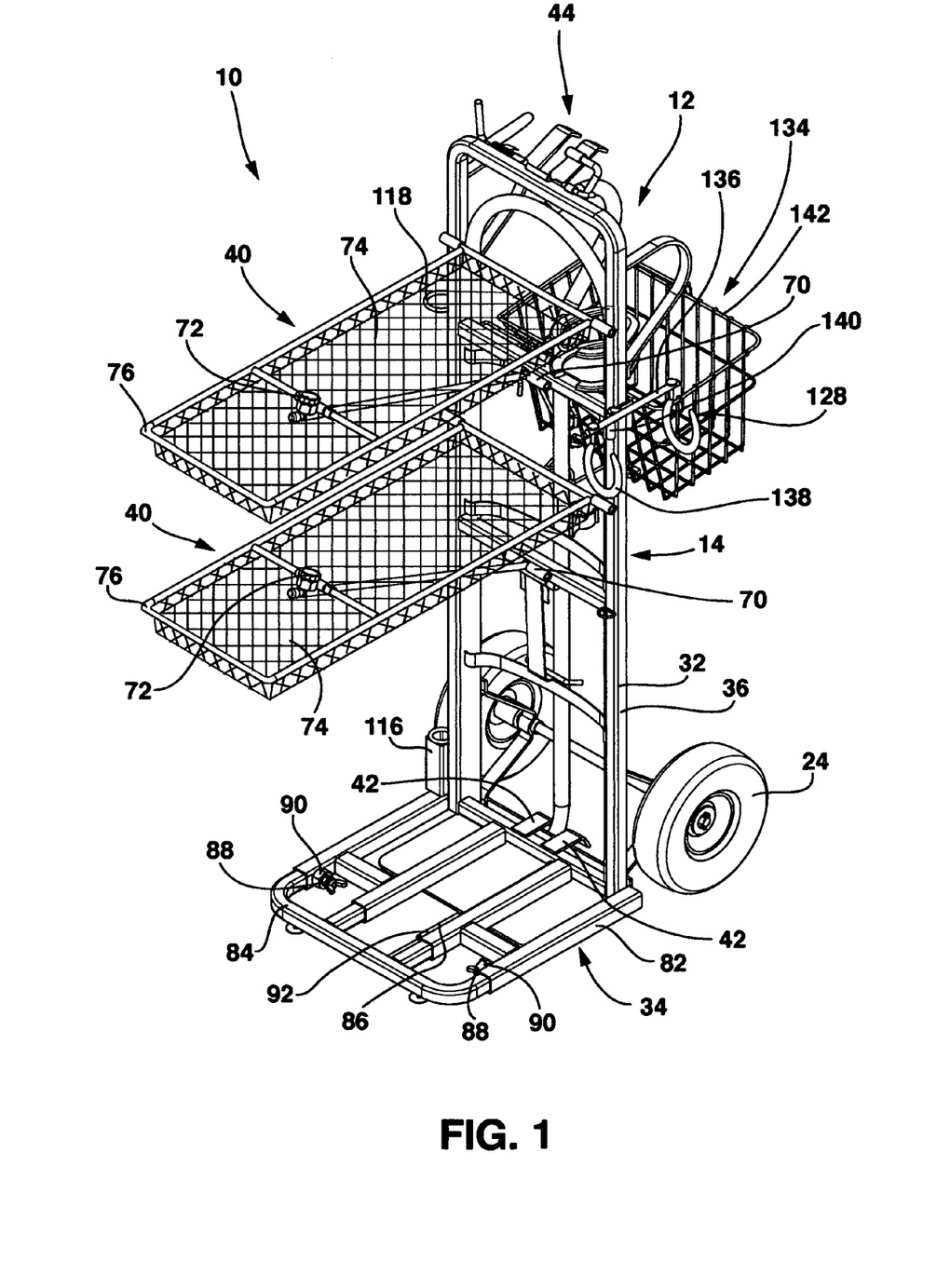
FIG. 1 is a perspective view of an equipment carrier attached to a dolly.
Figure 2:
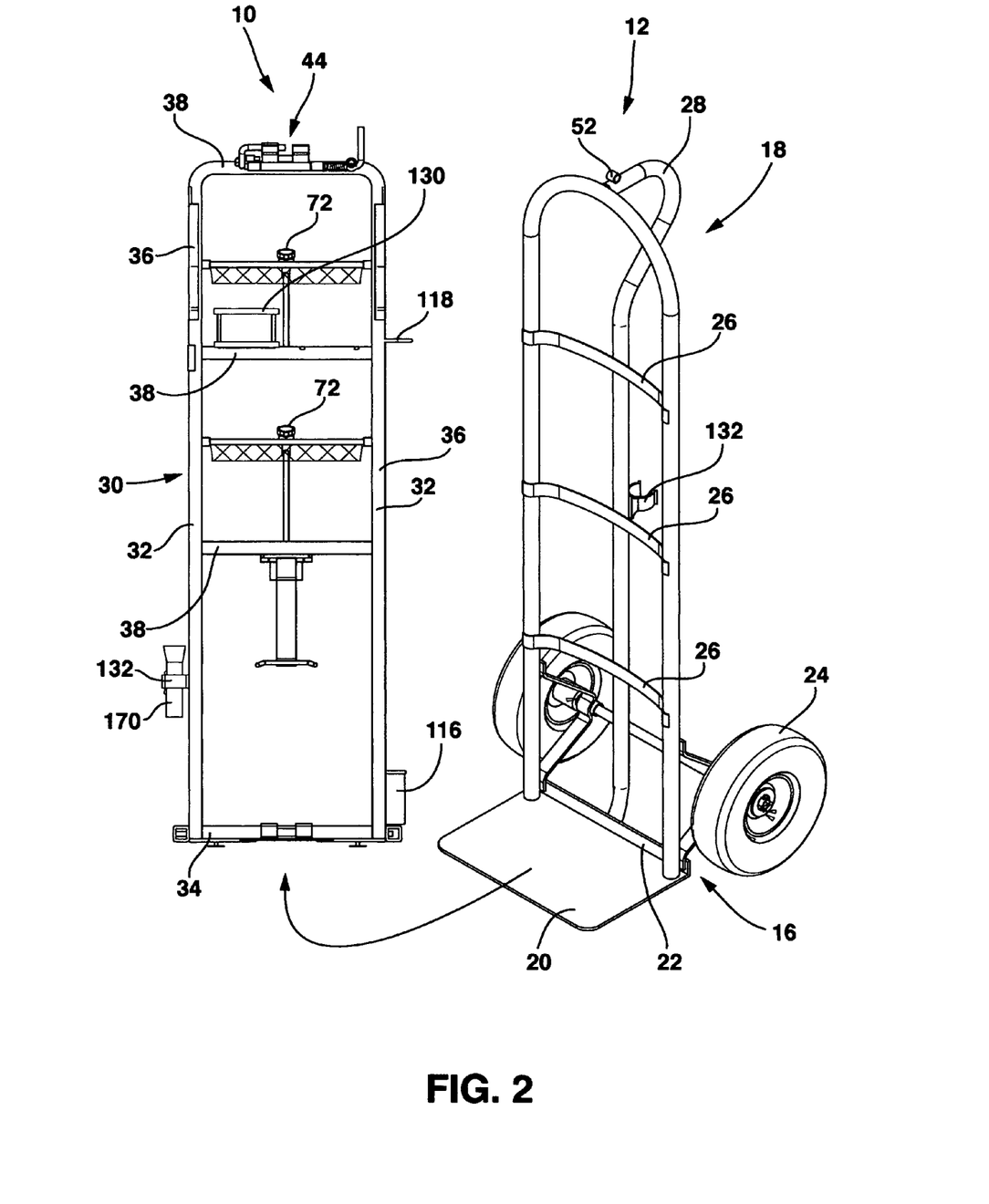
FIG. 2 is a perspective view of the equipment carrier separate from the dolly.

An equipment carrier of the invention is shown in FIG. 1 and is generally referred to as 10. Equipment carrier 10 is shown in combination with the dolly 12. A feature of the invention is the attachment of a dolly 12 to the equipment carrier 10 for transportation of the equipment carrier 10 as shown in FIGS. 1, 5, 6 and 8. The dolly 12 is a standard dolly as is well understood in the art and typically has a frame 14 having a lower end 16 and an upper end 18, a base plate 20 attached to the lower end 16 of the frame 14 and having a lip 22 on an edge of the base plate 20 near the lower end 16, wheels 24 attached to the frame 14 near the lower end 16 of the frame 14, central support members 26 that horizontally span the frame 14 and a handle 28, usually attached near the upper end 18 of the frame 14. In FIG. 2, the dolly 12 is shown separated from equipment carrier 10.

An important function of the equipment carrier 10 in several embodiments is to safely and easily store, transport or both a primary work item and also, in one or more embodiments, to accommodate additional accessory work items. Equipment carrier 10 of equipment carrier 10 includes a frame 30. The function of the frame 30 is to interact with one or more work items to securely position the work items during transport and storage, be removably attachable to and detachable from a dolly 12 and to be self-standing when not attached to a dolly 12.

In a preferred embodiment of the equipment carrier 10, the frame 30 has an inverted U member 32 and a base frame 34 attached to the lower end of the inverted U member 32. In one embodiment of the equipment carrier 10, the inverted U member 32 is formed by a pair of vertical frame pieces 36 connected by cross pieces 38 that horizontally span the space between the vertical frame pieces 36. As a result, the inverted U member 32 includes the two vertical frame pieces 36 and one or more cross pieces 38 connecting the two vertical frame pieces 36. In an embodiment of the equipment carrier 10, shown in FIGS. 1, 2 and 7, the equipment carrier 10 includes work piece arms 40. In a preferred embodiment of the equipment carrier 10, the work piece arms 40 can be made to extend away from the vertical frame pieces 36 to a substantially horizontal position or can be folded down in a substantially vertical position parallel to the vertical frame pieces 36. In another embodiment of the equipment carrier 10, the work piece arms 40 extend permanently from the vertical frame pieces 36 in a substantially horizontal configuration.

As described above, the equipment carrier 10 is attachable to the dolly 12 through an attachment mechanism. In a preferred embodiment of the invention, the attachment mechanism is fingers 42 on base frame 34 and locking mechanism 44 at the upper end of the inverted U member 32. Fingers 42 extend toward the dolly 12 and downward when the dolly 12 is moved into contact with the frame 30. Equipment carrier 10 slides onto the dolly 12 and the downward directed part of the fingers 42 grasps the base plate 20 of the dolly 12. Locking mechanism 44 attaches to the upper end 18 of the dolly 12 securing equipment carrier 10 to the dolly 12.

Figure 3:
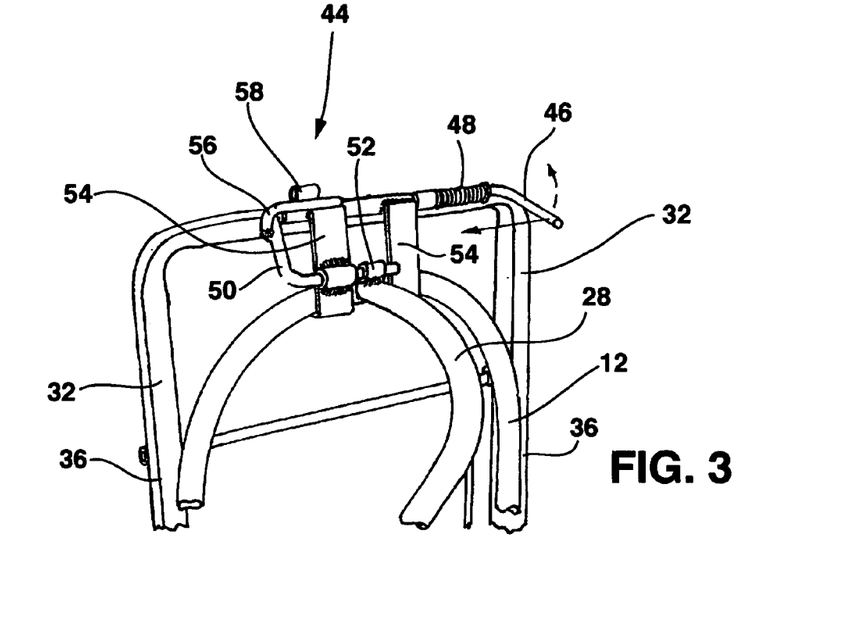
FIG. 3 is a perspective view of a locking mechanism of the equipment carrier and dolly.
Figure 4:
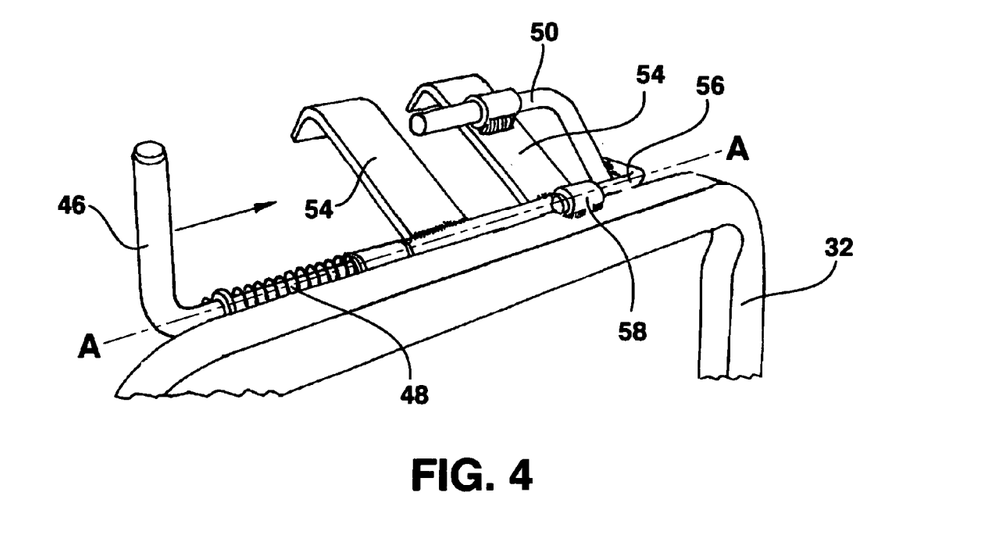
FIG. 4 is an enlarged view of the locking mechanism of FIG. 3 in an open position.

A preferred embodiment of the locking mechanism 44 is shown in more detail in FIGS. 3 and 4. Locking mechanism 44 includes handle 46, spring 48, a U-shaped pin 50, collar 52 (on the frame 14 or handle 28 of the dolly 12), fingers 54, pin 56 and collar 58 (on the inverted U member 32). Handle 46 has an elongated axis "A" and is rotatable about this elongated axis and movable along this elongated axis (FIG. 4). Handle 46 is attached to and operates pin 50 that is engageable with collar 52 by passing through and mating with collar 52 when the handle 46 is in a first configuration with the fingers 54 in contact with the dolly 12. Handle 46 also operates pin 56 that is also attached to the handle 46 and that is engageable with collar 58 by passing through and mating with collar 58 when handle 46 is a second configuration with the fingers 54 out of contact with the dolly 12.

In a preferred embodiment, the action of the locking mechanism 44 is laterally biased by spring 48, that is, the spring 48 biases the handle 46 away from the center of the frame 30. As stated above, handle 46 is operable for both lateral and rotational movement about its axis "A." Locking mechanism 44 is shown in FIG. 3 in position securing equipment carrier 10 to the dolly 12. Two fingers 54 hook the upper portion of the dolly 12. Pin 50 is engaged through collar 52 and retained in this engagement by the action of the spring 48 on the handle 46.

To release locking mechanism 44, handle 46 is laterally moved inward (i.e., towards the midline of the frame 30) against the bias of the spring 48 thereby releasing pin 50 from collar 52. Then handle 46 is rotated upward around the axis "A" lifting fingers 54 away from the dolly 12 as shown in FIG. 4. To secure the locking mechanism 44 in an open position (i.e., a position not engaging the upper end 18 of the dolly 12), pin 56 is rotated by rotation of handle 46 until pin 56 is aligned with the collar 58 (attached to equipment carrier 10) and then the pin 56 is inserted into collar 58 (FIG. 4).

Figure 7:
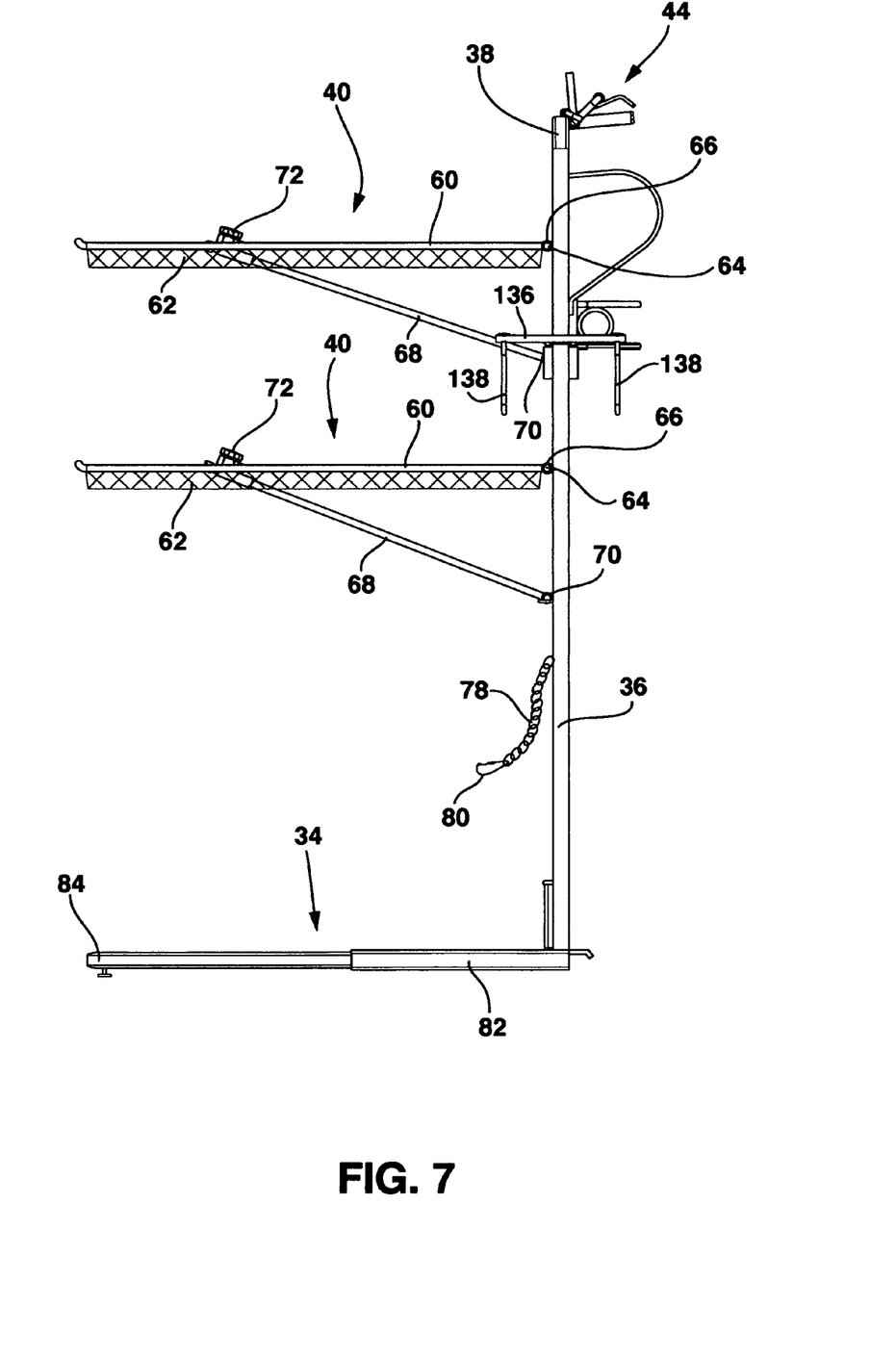
FIG. 7 is a side view of another embodiment of the equipment carrier.

Folding work piece arms 40 are shown in more detail in FIG. 7. In a preferred embodiment, each work piece arm 40 includes U-shaped arm 60 and center cross bar 62. Arm 60 is connected to shaft 64 that is rotatably connected to a vertical frame piece 36 at sleeves 66 to form a bearing by the interaction between shaft 64 and sleeves 66. Cross bar 62 is attached preferably across U-shaped arm 60 to add rigidity to the arms 40. Each work piece arm 40 is held in a horizontal position by a strut 68 that extends from a vertical frame piece 36 to the arm 60 and is rotatably connected to the vertical frame pieces 36 by a sleeve 70. Fastener 72 at the distal end of strut 68 connects strut 68 to cross bar 62.

In FIGS. 1, 2 and 7, work piece arms 40 are shown in the horizontal position for carrying work items. The work piece arms 40 may support a rack 74 with a upwardly extending peripheral edge 76 or may include an upward curved portion at is distal end to prevent work items placed across the work piece arms 40 or on the rack 74 from sliding off during transportation. Work piece arms 40 fold from a horizontal position to a vertical position when they are not in use. To fold arms 40 downward, strut 68 is moved upward, so that fastener 72 disengages cross bar 62. This allows U-shaped arm 60 to rotate downward into a vertical position parallel to the vertical frame pieces 36. Then strut 68 also rotates downward into a vertical position parallel to the vertical frame pieces 36.

The work piece arms 40 may be secured in the vertical position by a retention chain 78 and clip 80 attached to the vertical frame pieces 36 as shown in FIG. 7

Another feature of equipment carrier 10 in one embodiment is to have base frame 34 be telescoping. The function of the telescoping base frame 34 is to extend the base frame 34 away from the inverted U member 32 to help prevent the equipment carrier 10 from tipping over when placing large work items or work items that extend beyond the "footplate" of the base frame 34 on the equipment carrier 10. As shown in FIG. 1, the base frame 34 includes a proximal portion 82, distal portion 84, stop 86, lynch pin 88, holes 90 and collar 92. Proximal portion 82 is attached to vertical frame pieces 36 and has fingers 42 for attachment to an upstanding lip 22 of base plate 20 of dolly 12, as shown in FIG. 1. The distal portion 84 nests inside of proximal portion 82 and telescopes outward to a fully extended position as shown in FIG. 7. When distal portion 84 is fully extended, stop 86 hits collar 92 to prevent distal portion 84 from disengaging proximal portion 82. Distal portion 84 is secured in the extended position by lynch pin 88 being inserted, through hole 90 in both the distal portion 84 and the proximal portion 82.

To retract the distal portion 84 into the proximal portion 82, lynch pin 88 is removed from hole 90, allowing movement of the distal portion towards the proximal portion 82. When distal portion 84 is fully inserted hole 92 in the distal portion aligns with hole 90 in the proximal portion allowing the securing of the distal portion in the retracted or nested position by the insertion of the lynch pin 88 into a respective hole 90.

Figure 5:
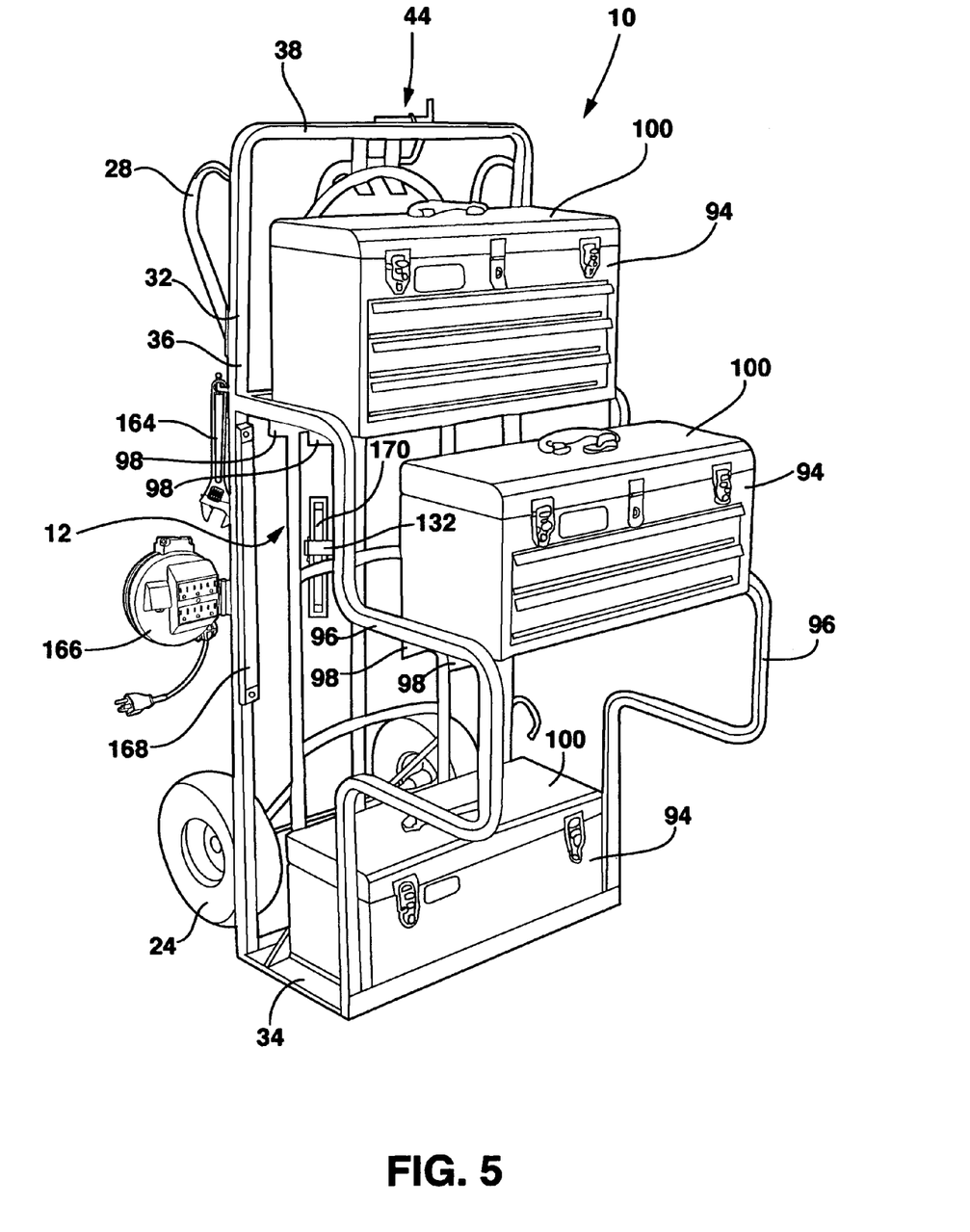
FIG. 5 is a perspective view of one embodiment of the equipment carrier.

As mentioned above, the equipment carrier 10 is intended to carry many different work items. FIG. 5 shows and embodiment of the equipment carrier 10 carrying several tool boxes. In this embodiment of the equipment carrier 10, a tool box 94 may be placed on the base frame 34. Further, the equipment carrier 10 may include a pair of side frames 96 attached to the vertical frame pieces 36. Support members 98 extend between the side frames 96 to support one or more tool boxes 94.

As mentioned above, several tool boxes 94 may be placed on the equipment carrier 10. If a tool box 94 is located immediately below another tool box 94, it may be difficult to open a top lid 100 of the bottom tool box 94 because of its close proximity to the tool box 94 above. Therefore, in one embodiment of the equipment carrier 10, the side frames 96 are configured to displace the support members 98, and consequently a tool box 94 resting on such support members 98, forward of a tool box 94 situated above (FIG. 5) to allow a top lid 100 of the bottom tool box 94 to open without interfering contact with the tool box 94 above.

In a variant of this embodiment, rails may be placed on the support members 98 that support the tool box 94 that is desired to be displaceable to a forward position in order to open its top lid 100. The rails, such as those used on heavyduty drawers, allow this tool box 94 to be moved to a configuration close to the vertical frame pieces 36 during transportation or storage of the tool boxes and them moved along the rails to a forward configuration away from the vertical frame pieces 36 when it is desired to use the tool box 94, particularly to open the top lid 100 of this tool box 94. In these ways, several tool boxes 94 may be compactly vertically stacked and still be functional. In this embodiment of the equipment carrier 10, it may be desirable to have a telescoping base frame 34 and extend the base frame 34 to add stability to the equipment carrier 10.

Although support members 98 have been described above that extend between the side frames 96 to support one or more tool boxes 94, it is intended that the support members 98 may support any work item including, but not limited to, those specific work items described herein.

Figure 6:
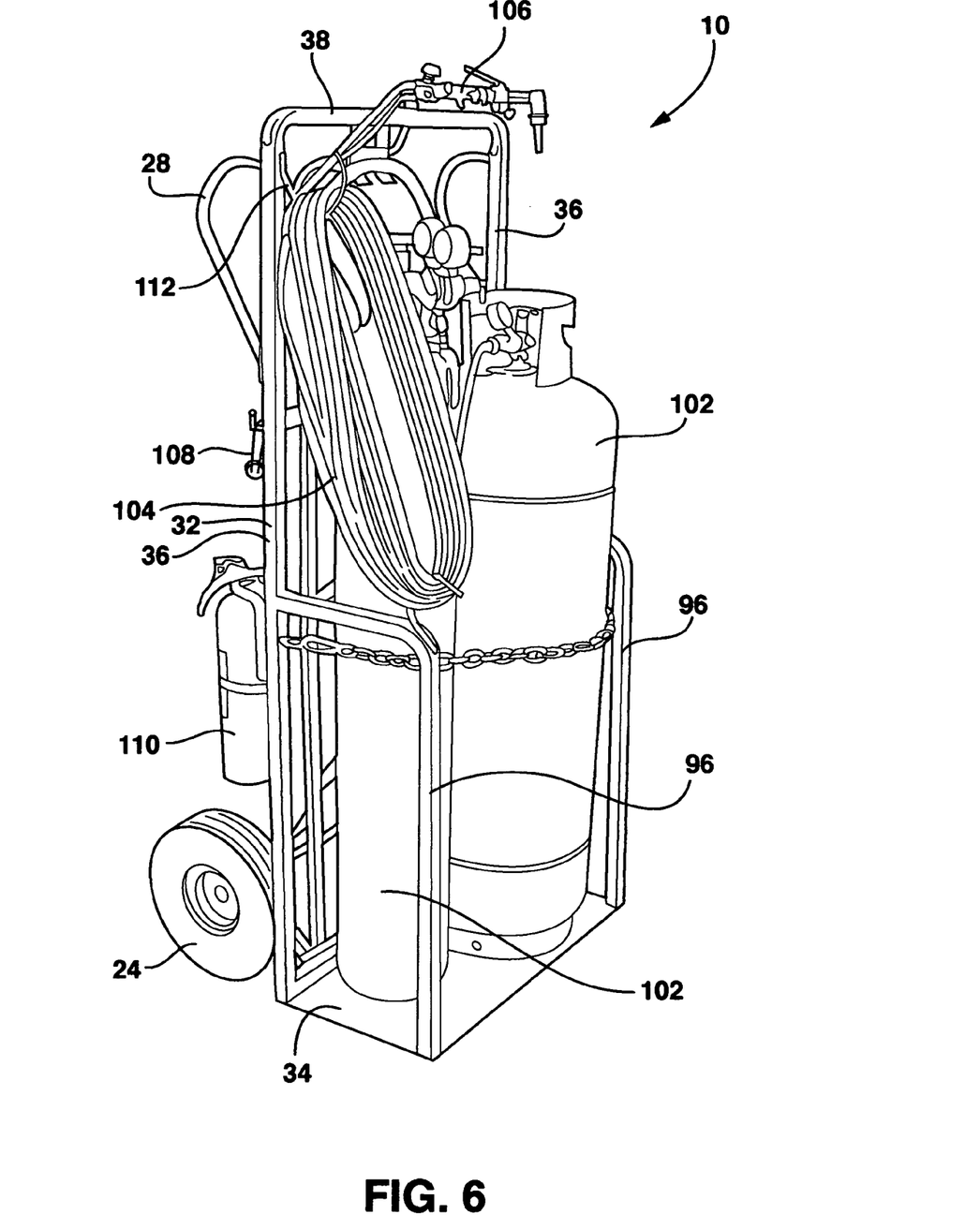
FIG. 6 is a perspective view of another embodiment of the equipment carrier.

In another embodiment of the equipment carrier 10 shown in FIG. 6, compressed gas tanks 102 such as those used for cutting or welding may be placed on the equipment carrier 10 as shown in FIG. 6. In this embodiment, a pair of side frames 96 are attached to the vertical frame pieces 36. However, in this embodiment the function of the side frames 96 is to retain the compressed gas tanks 102 on the base frame 34. Consequently, in this embodiment there is no need for support members 98 that extend between the side frames 96. Also, because compressed gas tanks 102 usually have accompanying hoses 104, torches 106, strikers 108, fire extinguishers 110 and other tools and accessories, the side frames 96 in this embodiment extend up only a portion of the height of the vertical frame pieces 36. A hook 112 is preferably attached to the vertical frame near the top of the vertical frame to support the hoses. Because the side frames 96 extend up only for a portion of the sides of the vertical frame pieces 36, the hose 104 supported on the hook 112 is able to hang down from the hook 112 unencumbered by contact with the side frame 96. In this embodiment of the equipment carrier 10 as well, it may be desirable to have a telescoping base frame 34 and extend the base frame 34 to add stability to the equipment carrier 10.

Figure 8:
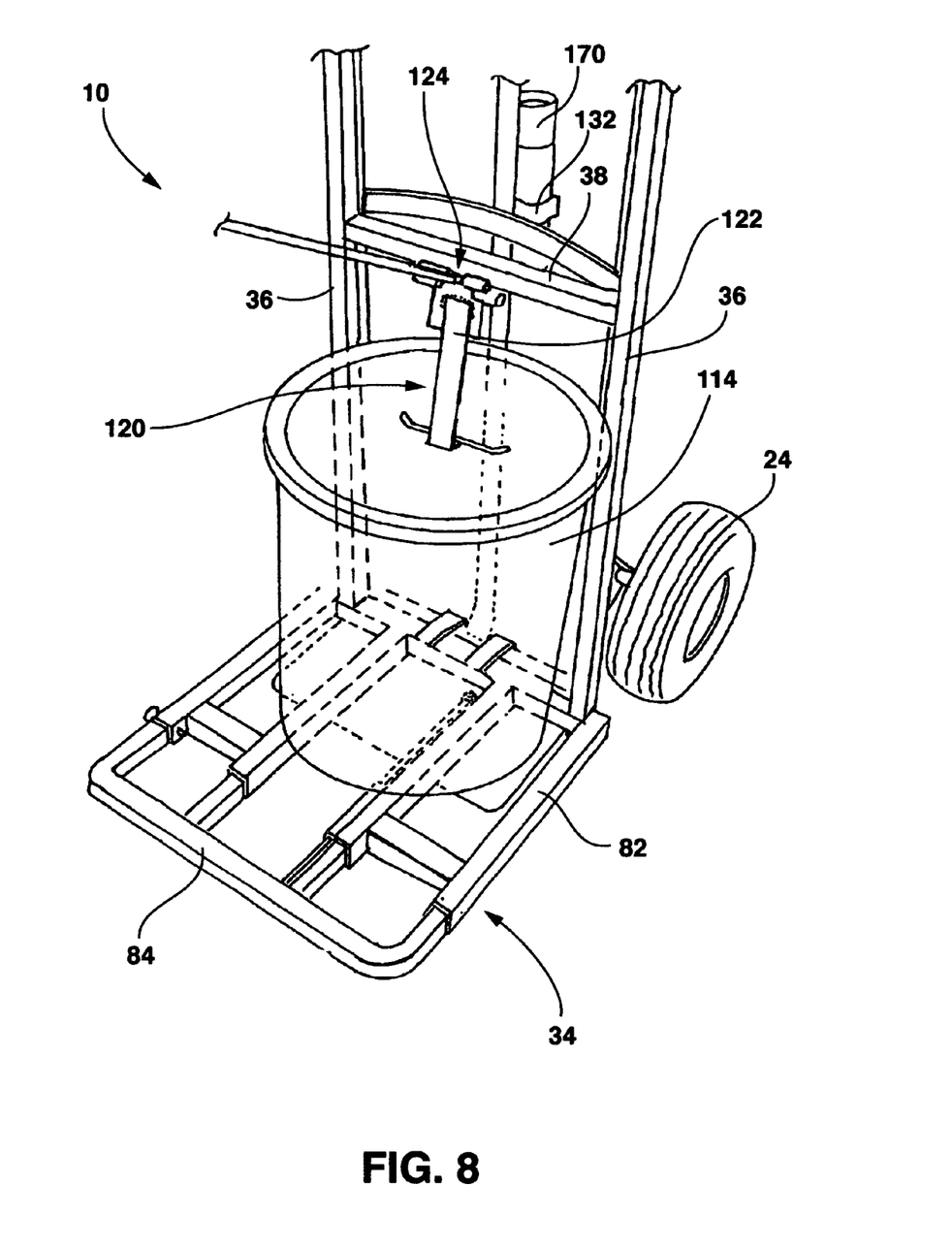
FIG. 8 is a perspective view of another embodiment of the equipment carrier.

In another embodiment of the equipment carrier 10 shown in FIG. 8, a bucket 114 is supported on the base frame 34 and carried by the equipment carrier 10. In this embodiment, it may also be desirable but is not required to have a pair of side frames 96 attached to the vertical frame pieces 36 to retain the bucket 114 on the base frame 34. Although a bucket 114 has been described as being transported by the equipment carrier 10, any other work item large or small may be transported, including but not limited to, a barrel, crate, tub or box. Again, in this embodiment of the equipment carrier 10 it may be desirable to have a telescoping base frame 34 and extend the base frame 34 to add stability to the equipment carrier 10.

Another feature of equipment carrier 10 in one or more embodiments is attached collars 116 and 118 (FIGS. 1 and 2) for preferably holding an elongated tool or implement such as a rake, broom or similar elongated tool, implement or device. A lower collar 116 and upper collar 118 are vertically aligned on a side face of vertical frame pieces 36. Upper collar 118 is hollow or ring-like allowing the handle of a rake, broom or similar device to pass through down to lower collar 116, which has a bottom to hold the end of a handle.

Another feature of equipment carrier 10 is bucket clip 120 attached to a cross piece 38 as shown in FIG. 8. Bucket clip 120 is comprised of lever arm 122 and spring-biased hinge 124. The spring-biased hinge 124 allows the lever arm 122 to rotate from a substantially vertical position to a substantially horizontal position in order to position a large bucket 114 on base frame 34. The spring-bias of hinge 124 forces lever arm 122 to return to its vertical position, thereby clamping the bucket 114 to the base frame 34 as seen in FIG. 8.

Additional features of the equipment carrier 10 include one or more auxiliary work item holders 128. These auxiliary work item holders 128 could take the form of a cup holder 130, flashlight clip 132 or basket assembly 134 as shown in FIGS. 1, 2 and 7. In one embodiment, an auxiliary work item holder 128 is comprised of a support bar 136, hooks 138 and a pin 140. Hooks 138 (preferably two) are attached to the support bar 136 for supporting items such as power cords, rope, cable or the like. Pin 140 attaches the support bar 136 to the side of a vertical frame piece 36. Cup holder 130 is attached to a cross piece 38 and is typically an open cylinder for holding a cup or can. Flashlight clip 132 attaches a flashlight to a vertical frame piece 36.

Figure 9:
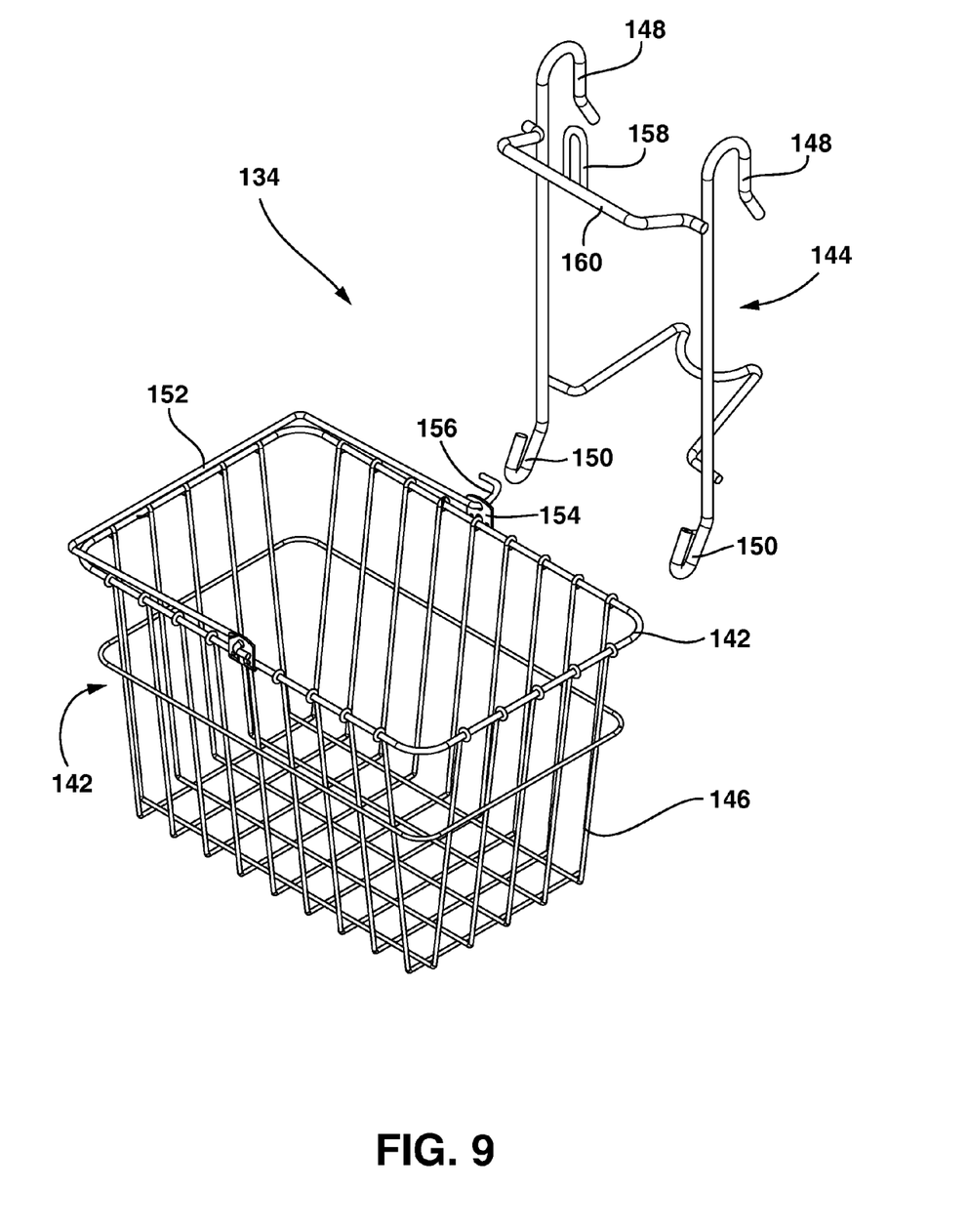
FIG. 9 is a perspective view of a basket assembly.

Basket assembly 134 is supported by the dolly 12 and does not require equipment carrier 10 to be mounted on the dolly 12. Basket assembly 134 includes a basket 142 held by a bracket 144. Bracket 144 is formed with two upper hooks 148 and two lower hooks 150. Bracket 144 rests against the frame 14 of the dolly 12 while hooks 148 attach to a central support member 26 of the dolly 12.

Basket assembly 134 is seen separated from the dolly 12 in FIGS. 9. Bracket 144 is preferably curved to stabilize the bracket 144 and to reduce lateral movement of the basket assembly 134. Bracket 144 is preferably bent towards the dolly 12 to allow bracket 144 to carry the basket 142 in an upright position. As mentioned above, bracket 144 also preferably has two lower hooks 150. Lower hooks 150 support the lower end 146 of basket 142. The basket 142 is preferably a wire frame or mesh basket. Possible alternative embodiments include a solid frame basket with openings to accommodate the lower hooks 150. In the preferred embodiment, a handle 152 is mounted to the basket 142 through a pivot 154 on basket 142. One end of the handle 152 forms a finger 156 that extends away from the basket 142 in a curved fashion.

Bracket 144 also includes a loop 158 and a bridge 160. The bridge 160 is attached between the upper hooks 148 and supports loop 158. The loop 158 captures the finger 156 as the handle 152 is rotated into contact with the basket 142 thereby securing the upper portion 160 of the basket 142 to the bracket 144. In the preferred embodiment, finger 156 is parallel to handle 152 so that as the handle 152 is rotated around the pivot 154, the finger moves into secure engagement with the loop 158.

To secure the basket 142 to the bracket 144, lower end 146 is engaged in lower hooks 150. Then handle 152 is positioned vertical relative to basket 142, allowing finger 156 to be inserted through loop 158. While the finger 156 is maintained through the loop 158, the handle 152 is rotated to a horizontal position (into contact with the basket 142), likewise rotating finger 156 to a horizontal position trapping finger 156 on the opposite side of loop 158 from the basket 142. This secures upper portion 160 of basket 142 to bracket 144 as seen in FIG. 1.

Basket 142 is released by rotating handle 152 from a horizontal position to a vertical position, thereby allowing finger 156 to pass through loop 158, which releases upper portion 160 of basket 142. Then basket 142 may be lifted from lower hooks 150, thereby separating basket 142 from bracket 144.

In an alternate embodiment of the equipment carrier 10, a basket 142 may be suspended from the support members 98, for example under a tool box 94 that is displaced or displaceable from the vertical frame pieces 36. Further, aspects of the equipment carrier 10 that have been described above may be combined. For example, in the embodiment of the equipment carrier 10 carrying a bucket 114, side frames 96 may be attached to the vertical frame pieces 36 above the bucket 114 and have support members 98 above the bucket 114 to support one or more tool boxes 94 or racks 74.

As mentioned above, it is desirable for the equipment carrier 10 to transport or store accessory work items as well as primary work items such as racks 74, tool boxes 94, compressed gas tanks 102 or bucket 114. Such accessory work items may be transported by one or more auxiliary work item holders 128. In addition to the forms of auxiliary work item holders 128 previously mentioned, the auxiliary work item holders 128 could include, but are not limited to, tools 164, power strips 166, magnetic strips 168, flashlight 170 or fire extinguishers 110 (FIG. 5). Typically, these accessory work items are attached to the vertical frame pieces 36 but may also be attached to other aspects of the frame 30 including the side frames 96.

In use, the equipment carrier 10 slides onto the dolly 12 and fingers 42 grasp the base plate 20 of the dolly 12 as explained above. The locking mechanism 44 attaches and secures the upper end of the equipment carrier 10 to the dolly 12. The equipment carrier 10 may then be moved to a desired location by grasping the handle 28 and tilting the dolly 12 back. Because the equipment carrier 10 is securely attached to the dolly 12, the equipment carrier 10 will also be tilted back. The user then moves the dolly 12, and consequently the equipment carrier 10, to a desired location on the wheels 24 of the dolly 12. At the desired location, the user tips the dolly 12 forward so that the base frame 34 comes into contact with the ground or floor.

At this point if desired, the equipment carrier 10 may be retained in secure contact with the dolly 12. Alternately, the equipment carrier 10 may be separated from the dolly 12 as described above so that the equipment carrier 10 remains separate from the dolly 12. The dolly 12 may then be used for other purposes including moving other equipment carriers 10. The equipment carrier 10 may then be used as an independent tool or work item storage device. Later, if it is desirable to move the equipment carrier 10, the user simply reconnects the dolly 12 to the equipment carrier 10 as described above.

The invention also include a method for transporting and storing work items and related items in conjunction with a dolly. The method comprises the steps of:
  providing a self-standing frame 30 for positioning one or more work items for transport or storage;
  positioning one or more work items on the frame 30;
  attaching the frame 30 to the dolly 12;
  transporting the frame 30 using the dolly 12; and
  detaching the frame 30 from the dolly 12.

The method does not require the work item to be loaded on the frame 30 before attaching the frame 30 to a dolly 12. The frame 30 may be attached to a dolly 12 and then have the work item loaded on the frame 30.

Although an equipment carrier 10 has been described herein as interacting with a dolly 12, in an embodiment of the invention a system for transporting and storing work items and related items is disclosed. This system comprises a dolly 12, adapted to have a collar 52, and an equipment carrier 10. In addition, although the collar 52 has been described as being attached to the handle 28 of the dolly 12, the collar 52 could also be placed other places on the frame 14 of the dolly 12 including, but not limited to, the upper end 18.

Throughout this description, components have sometimes been described as occurring in pairs or singly or described in the plural or singular. For example, the word "fingers" as used in connection with "fingers 54" is the plural form of "finger." Wherever occurrences of elements are described in the singular or plural, it is to be understood that unless stated otherwise, such elements may also be used in the opposite form as will be clear to those skilled in the art. In other words, if an element is described in the plural form, that element may also be used in the singular or vice versa unless specifically stated otherwise.

Although the present invention has been described with reference to preferred embodiments, workers skilled in the art will recognize that changes may be made in form and detail without departing from the spirit and scope of the invention. Several different work items have also been described. However, these work items are intended to illustrate classes or categories of work items. Consequently, other work items, more or less similar to those described, can be accommodated by the equipment carrier 10.

As mentioned, the equipment carrier 10 of the present invention has been described in connection with certain embodiments, configurations and relative dimensions. However, the description above is not to be construed as being absolutely particular. It is to be understood that the description given herein has been given for the purpose of explaining and illustrating the equipment carrier 10 and is not intended to limit the scope of the invention. For example, the specific dimensions and configuration of the components of the equipment carrier 10 may be varied so long as the dimensions and configurations of the equipment carrier 10 provide the function of transporting and storing work items and related items. Further, specific details of the frame 14 and its components may be varied as will occur to those skilled in the art so long as a sturdy and function frame 14, as described herein, is provided. Also, there are many materials and configurations that can be used in constructing the equipment carrier 10 that will be well understood by those skilled in the art including those being developed or that will be developed. In addition, it is clear than an almost infinite number of minor variations to the form and function of the disclosed equipment carrier 10 could be made and also still be within the scope of the invention. Consequently, it is not intended that the equipment carrier 10 be limited to the specific embodiments and variants of the invention disclosed. It is to be further understood that changes and modifications to the descriptions given herein will occur to those skilled in the art. Therefore, the scope of the invention should be limited only by the scope of the claims.

The invention claimed is:

1. An equipment carrier interacting with a dolly, the equipment carrier comprising:
   a self-standing frame for positioning one or more work items for transport or storage, the frame having a lower end and an upper end, the self standing frame comprising:
      a rectangular base frame having a front and a back opposite the front;
      a pair of vertical frame pieces each extending vertically from opposing sides of the back of the base frame;
      a pair side frames each extending vertically from opposing sides of the front of the base frame and intersecting at a point on a vertical frame piece, each of the side frames having a plurality of bends that form at least a first horizontal section at a first level above the base frame and a second horizontal section at a second level above the first level, the second horizontal section extending out from the vertical frame piece a first distance and the first horizontal section extending further out from the vertical frame piece from a point beyond the first distance;
      at least one support member extending between each of the horizontal sections of the side frames therewith forming a frame for receiving a work item; and
   an attachment mechanism for attaching the frame to and detaching the frame from the dolly.

2. The equipment carrier of claim 1 wherein the dolly has a base plate with an upstanding lip and wherein the attachment mechanism comprises: at least one first finger on the base frame for engagement with the upstanding lip of a base plate of the dolly, the at least one first finger extending toward the dolly and downward when the dolly is moved into contact with the frame wherein the at least one first finger grasps the upstanding lip of a base plate of a dolly; and a locking mechanism located at the upper end of the frame that attaches to the dolly.

3. The equipment carrier of claim 2 wherein the dolly has a collar attached to the dolly and wherein the locking mechanism includes: a handle connected to a U-shaped first pin and a second pin, the first pin and second pin extending away from the handle at different angular configurations, the handle having an elongated axis and being rotatable about and movable along the elongated axis; at least one second finger attached to and extending away from the handle, the at least one second finger engagable with the dolly; a collar located on the frame; wherein the handle is rotated about its elongated axis to bring the at least one second finger into contact with the dolly and the handle is moved laterally along its elongated axis so that the first pin engages the collar on the dolly whereby the handle is locked into a configuration with the at least one second finger in secure engagement with the dolly, and wherein the handle is moved laterally along its elongated axis so that the first pin disengages the collar on the dolly and the handle is rotated about its elongated axis to bring the at least one second finger out of contact with the dolly and the handle is moved laterally along its elongated axis so that the second pin engages the collar on the frame whereby the handle is locked into a configuration with the at least one second finger out of engagement with the dolly.

4. The equipment carrier of claim 1 further comprising a bucket clip that includes an arm rotatably coupled to the frame and wherein the arm is spring-biased towards the base frame.

5. The equipment carrier of claim 1 wherein the frame comprises: an inverted U member having a lower end; and a base frame attached to the lower end of the inverted U member.

6. The equipment carrier of claim 5 wherein the inverted U member includes: a pair of vertical frame pieces displaced from each other in parallel; at least one cross piece horizontally spanning the space between the vertical frame pieces.

7. The equipment carrier of claim 1 wherein the side frames extend along only a portion of the frame.

8. The equipment carrier of claim 1 further comprising at least one support member extending between the side frames to support a work item.

9. The equipment carrier of claim 8 wherein there are at least two groups of support members and wherein the side frames are configured to displace at least one group of support members forward of another group of support members.

10. The equipment carrier of claim 1 wherein the work item is chosen from the group consisting of a tool box, a compressed gas tank, a bucket, a barrel, a crate, a tub or a box.

11. The equipment carrier of claim 1 further comprising at least one auxiliary work item holder chosen from the group consisting of a cup holder, flashlight clip, power strip, magnetic strips, flashlight, fire extinguishers and basket assembly.

12. The equipment carrier of claim 11 wherein the basket assembly comprises: a basket; a bracket connecting the basket to the dolly, the bracket formed with at least one upper hook and at least one lower hook wherein the bracket rests against the frame of the dolly while the at least one upper hook attaches to the dolly.

* * * * *